United States Patent
Valasek et al.

(10) Patent No.: US 10,089,116 B2
(45) Date of Patent: *Oct. 2, 2018

(54) SECURE START SYSTEM FOR AN AUTONOMOUS VEHICLE

(71) Applicant: Uber Technologies, Inc., San Francisco, CA (US)

(72) Inventors: Christopher Valasek, Pittsburgh, PA (US); Charles Miller, St. Louis, MO (US)

(73) Assignee: Uber Technologies, Inc., San Francisco, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 15/074,892

(22) Filed: Mar. 18, 2016

(65) Prior Publication Data
US 2017/0269940 A1    Sep. 21, 2017

(51) Int. Cl.
| | |
|---|---|
| *G06F 21/00* | (2013.01) |
| *G06F 9/4401* | (2018.01) |
| *H04L 29/06* | (2006.01) |
| *H04W 12/04* | (2009.01) |
| *H04L 9/14* | (2006.01) |
| *H04W 12/06* | (2009.01) |
| *B60R 25/04* | (2013.01) |
| *H04L 9/08* | (2006.01) |
| *H04L 9/32* | (2006.01) |

(52) U.S. Cl.
CPC ............ *G06F 9/4403* (2013.01); *B60R 25/04* (2013.01); *H04L 9/0822* (2013.01); *H04L 9/0897* (2013.01); *H04L 9/14* (2013.01); *H04L 9/3226* (2013.01); *H04L 63/0428* (2013.01); *H04L 63/06* (2013.01); *H04W 12/04* (2013.01); *H04W 12/06* (2013.01); *H04L 2209/84* (2013.01)

(58) Field of Classification Search
CPC ..... G06F 9/4403; B60R 25/04; G05D 1/0088; H04B 1/3822; H04L 9/14; H04L 9/32; H04L 63/0428; H04L 63/06; H04W 12/04; H04W 12/06
USPC ...................................................... 713/182
See application file for complete search history.

(56) References Cited

U.S. PATENT DOCUMENTS

| | | |
|---|---|---|
| 4,023,753 A | 5/1977 | Dobler |
| 5,367,456 A | 11/1994 | Summerville |

(Continued)

OTHER PUBLICATIONS

Nishu Garg; MANET Security Issues; IJCSNS; vol. 9 No. 8, Aug. 2009; p. 241-246.*

(Continued)

*Primary Examiner* — Monjour Rahim
(74) *Attorney, Agent, or Firm* — Mahamedi IP Law LLP

(57) ABSTRACT

A secure start system for an autonomous vehicle (AV) can include a compute stack and a communications router. The communications router can include an encrypted router drive and an input interface to receive a boot-loader that includes a basic decryption key to decrypt the encrypted router drive and enable network communications with a backend system. The secure start system can utilizes a tunnel key from the backend system to establish a private communications session with a backend data vault, and retrieve a set of decryption keys from the backend data vault, via the private communications session, to decrypt a plurality of encrypted drives of the AV.

20 Claims, 7 Drawing Sheets

(56) References Cited

U.S. PATENT DOCUMENTS

| | | | |
|---|---|---|---|
| 5,559,695 A | 9/1996 | Daily | |
| 6,480,117 B1 | 11/2002 | Flick | |
| 6,611,193 B1 | 8/2003 | Weigl | |
| 7,484,008 B1* | 1/2009 | Gelvin | H04L 67/12 |
| | | | 701/408 |
| 9,784,229 B2 | 10/2017 | Holub | |
| 9,787,499 B2* | 10/2017 | Miller | H04L 12/4633 |
| 9,805,519 B2 | 10/2017 | Ramanujam | |
| 2004/0064698 A1* | 4/2004 | Zhang | G06F 21/34 |
| | | | 713/169 |
| 2006/0255910 A1* | 11/2006 | Fukushima | B60R 25/04 |
| | | | 340/5.65 |
| 2008/0136611 A1* | 6/2008 | Benco | B60R 25/2018 |
| | | | 340/426.3 |
| 2008/0318731 A1 | 12/2008 | Denis | |
| 2011/0138192 A1* | 6/2011 | Kocher | G06F 21/602 |
| | | | 713/189 |
| 2012/0155636 A1* | 6/2012 | Muthaiah | H04L 9/0825 |
| | | | 380/44 |
| 2013/0211697 A1 | 8/2013 | Grisi | |
| 2013/0212659 A1* | 8/2013 | Maher | H04L 63/06 |
| | | | 726/6 |
| 2014/0169564 A1* | 6/2014 | Gautama | G07C 9/00309 |
| | | | 380/270 |
| 2014/0379174 A1 | 12/2014 | Holub | |
| 2016/0012653 A1* | 1/2016 | Soroko | G07C 9/00007 |
| | | | 340/5.61 |
| 2017/0257345 A1* | 9/2017 | Westra | H04L 63/0823 |

OTHER PUBLICATIONS

McDowell et. el.; Secure Mobility and the Autonomous Driver; Published in: IEEE Transactions on Robotics (vol. 24, Issue: 3, Jun. 2008); IEEE Xplore.

Cummings et. al.; Who is in Charge? Promises and Pitfalls of Driverless Cars; TR News, 2014; pdfs.semanticscholar.org.

* cited by examiner

US 10,089,116 B2

SECURE START SYSTEM FOR AN AUTONOMOUS VEHICLE

BACKGROUND

As vehicle manufacturers continue to integrate network and computing resources into new model automobiles, the potential for malicious third-party access into the various computing systems of the vehicles becomes increasingly concerning. With the advent of autonomous vehicle (AV) technology, malicious third-party access can result in troubling outcomes.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
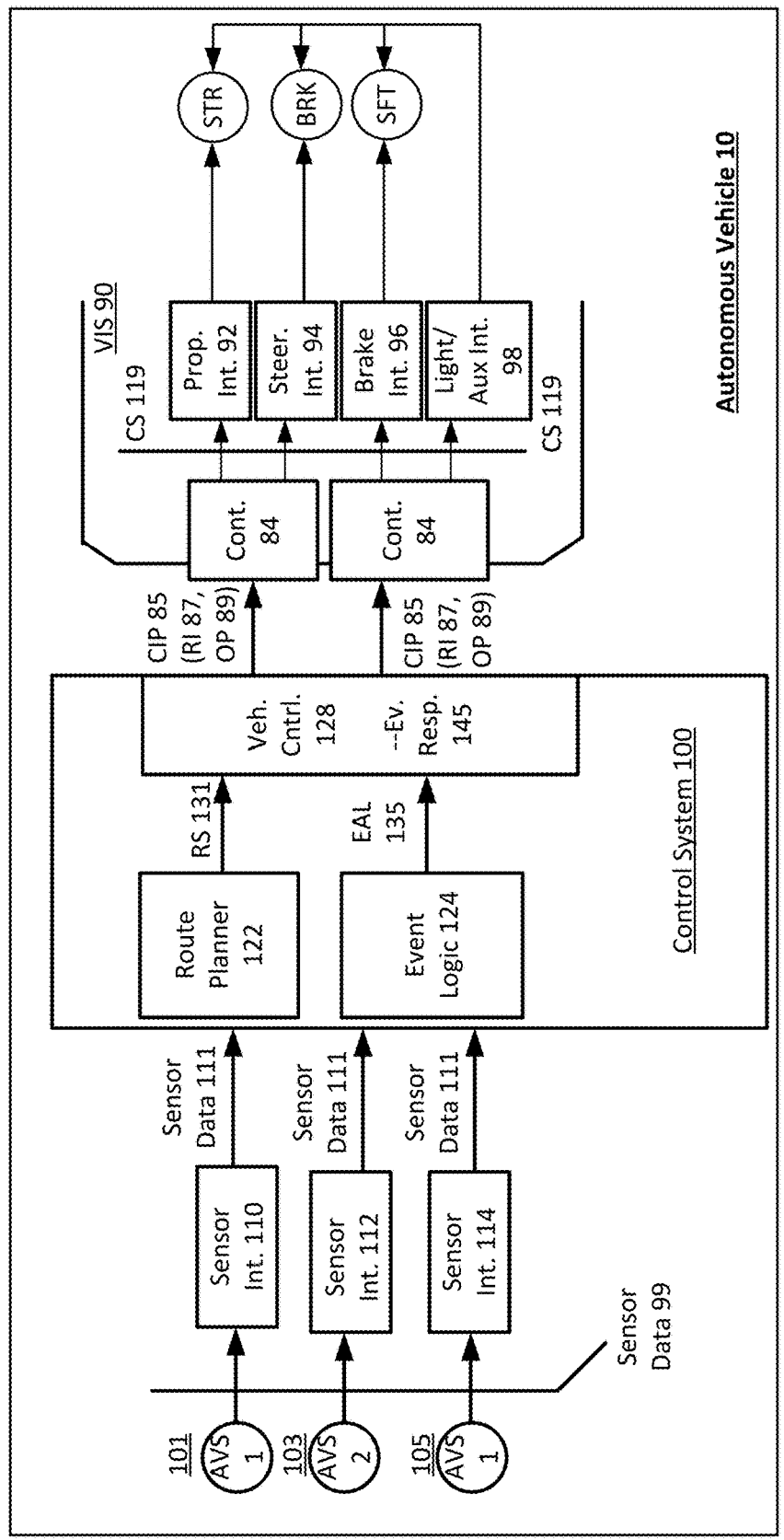
FIG. 1 is a block diagram illustrating an AV in accordance with example implementations.

Autonomous vehicles (AVs), or self-driving vehicles, may store encrypted and/or proprietary data to safeguard against unauthorized use, theft, and the potential for improper third-party access into the various subsystems of the AV. Such encrypted and proprietary data can be utilized by the AV to initiate the AV subsystems, such as a starting mechanism for the AV. According to examples described herein, boot-up of the AV's on-board computers may require a decryption process of compute stack drives to initialize various subsystems of the AV (e.g., an autonomous control system that operates the acceleration, steering, and braking systems). Thus, a secure start system for an autonomous vehicle is provided. The secure start system can include a switching module that connects to a compute stack comprising, among other encrypted drives, one or more secure drives including encrypted data (e.g., a cryptographically signed SquashFS image of the AV operating system ("AVOS image")) that, when decrypted, can enable autonomous drive functions of the AV. The secure start system can also include a communications router comprising a network interface, an encrypted router drive, and an input interface. In some examples, the input interface can be a port (e.g., a universal serial bus (USB) port) that can receive an authentication resource to decrypt the router drive for boot-up to enable network communications.

In certain implementations, the authentication resource can be a connectable boot-loader (e.g., a USB drive) that includes a key (e.g., a basic key) that decrypts the encrypted router drive to enable the network interface for communications. In variations, the basic key decrypts the AVOS image on the router drive to enable basic operating system functions (e.g., communication functions). In certain examples, the authentication resource can be certified or otherwise provided by an authorization authority, such as the manufacturer of the AV or a backend system that establishes communications with the AV. Once communications are enabled, the communications router can utilize credentials (e.g., rider information) to request a secure key (e.g., an IPsec tunnel key) from a backend system. In some aspects, the router can utilize the credentials to request and receive the secure key over a secure communications session (e.g., hypertext transfer protocol (HTTPS) session) with the backend system. The secure key can comprise a cryptographic key that enables the communications router to establish a private communications session (e.g., an Internet Protocol Security (IPsec) tunnel) with a backend data vault associated with the backend system (e.g., a system that is remote from the AV).

The backend system can authenticate the credentials and transmit the secure key to the communications router to enable the secure start system to establish the private communications session with the backend data vault. If the credentials (which may be stored in a known IP block) do not match backend access logs, the secure communications session can terminate without a secure key exchange. However, if the credentials are authenticated by the backend system, the communications router can receive the secure key (e.g., an IPsec tunnel key) to establish the private communications session with the backend vault. In one aspect, the backend data vault is not connected to publicly accessible networks (e.g., the Internet), and is only connectable via a private communications sessions (e.g., a virtual private network (VPN)).

In many examples, the compute stack can include multiple encrypted drives (e.g., with full disk encryption) that store data enabling various functions of the AV (e.g., perception, planning, navigation, autonomous drive functions). Additionally or alternatively, the compute stack can comprise a switching module (e.g., a 6U VPX form factor switch) which can contain or connect to the compute stack, which can include multiple networked machines and/or drives (e.g., drives to initialize AV subsystems and/or used for data storage). In certain implementations, when the AV is powered off, the compute stack can be encrypted with full disk encryption. A decryption process for the compute stack can be initiated by the switching module when the authentication resource (e.g., a boot-loader) is connected to the communications router. In certain examples, the decryption process can be initiated once a set of decryption keys is received from the backend vault after proper authentication by the backend system. The switching module can terminate the decryption process when a respective decryption key is lacking. Consequently, functions of the AV corresponding to encrypted drives without an associated decryption key will not be initiated. Additionally or alternatively, when full disk decryption of the compute stack is performed by the switching module, autonomous functions or an autonomous mode of the AV can be enabled or otherwise available for execution.

In variations, the operating system that runs on the AV's computing system (AVOS) can comprise a number of read-only, cryptographically signed file systems (e.g., SquashFS images). Additionally or alternatively, an autonomous mode file system (e.g., a cryptographically signed, SquashFS image containing files for executing autonomous mode for the AV ("autonomous file system")) can be stored in an unencrypted drive of the compute stack, and can require a secure decryption key (i.e., an "autonomous key") stored in the backend vault. According to examples described herein, the AVOS image may be encrypted and the one or more of the drives (e.g., a secure drive containing autonomous drive software) of the compute stack may remain unencrypted. Upon startup of the AV, a basic key (e.g., stored in a write protected, read-only block) can decrypt the AVOS image to enable basic operating system functions, such as communication functions with the backend system in order to receive or pull, for example, the autonomous keys to decrypt the autonomous image.

Accordingly, the secure start system can be implemented without the use of a secure boot-loader drive, where the basic key(s) can be stored on the secure start system itself. For example, in a startup phase, the basic key can unlock the AVOS image enabling boot-up of the AV's operating system with basic functionality (e.g., enabling human drive and communication functions). In certain aspects, secure information may be inputted (e.g., a username and password, an access token, biometric data, etc.), either on the rider's mobile device or on a user interface of the AV. The communications router of the AV can transmit the secure information to the backend system, which can authenticate the rider (e.g., authentication between the rider and the AV using an access list) and transmit a tunnel key back to the communications router.

According to examples described herein, the communications router can establish a secure communications session (e.g., an IPsec tunnel) with the backend vault, and an authentication procedure (e.g., a two-factor authentication) can be initiated between the compute stack and the backend vault. Once authenticated, a master node of the compute stack can receive a time-limited vault token from the backend vault, and utilize the vault token grab the set of decryption keys from the backend vault. The secure start system can utilize the decryption keys to, for example, perform a verification process and unlock the cryptographically signed and encrypted autonomous file system that enables the autonomous drive functions to be executed on the compute stack.

In some implementations, the secure key can be an Internet Protocol Security (IPsec) tunnel key, which can enable the communications router to establish an IPsec tunnel to the backend data vault to retrieve the set of decryption keys to unlock the compute stack. In various implementations, the set of encrypted keys unlock and enable the plurality of encrypted drives of the compute stack. The compute stack can include data logs that, in some aspects, implement full disk encryption to store session data corresponding to a drive session of the AV. The data logs can be accessible via insertion of a log reader or black box drive having an additional decryption key into the input interface of the communications router—where the log reader or black box drive can decrypt the data logs to retrieve the session data.

Examples described herein achieve a technical effect of preventing unauthorized third-party access to AVs. In particular, examples described seek to prevent third-party control of the autonomous functions of the AV, as well as preventing access to other functions and proprietary data. Further examples described herein enable a backend system to revoke credentials to prevent autonomous drive of the AV.

As used herein, a computing device refers to devices corresponding to desktop computers, cellular devices or smartphones, personal digital assistants (PDAs), laptop computers, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Numerous examples are referenced herein in context of an "autonomous vehicle" (AV) or a "self-driving vehicle." An AV or a self-driving vehicle refers to any vehicle which is operated in a state of automation with respect to steering and propulsion. Different levels of autonomy may exist with respect to AVs. For example, some vehicles may enable automation in limited scenarios, such as on highways, provided that drivers are present in the vehicle. More advanced AVs, such as fully autonomous self-driving vehicles, can drive without any human assistance from within or external to the vehicle.

System Description

FIG. 1 is a block diagram illustrating an AV in accordance with example implementations. In an example of FIG. 1, a control system 100 can be used to autonomously operate an AV 10 in a given geographic region for a variety of purposes, including transport services (e.g., transport of humans, delivery services, etc.). In examples described, an autonomously driven vehicle can operate without human control. For example, in the context of automobiles, an autonomously driven vehicle can steer, accelerate, shift, brake and operate lighting components. Some variations also recognize that an autonomous-capable vehicle can be operated either autonomously or manually.

In one implementation, the control system 100 can utilize specific sensor resources in order to intelligently operate the vehicle 10 in most common driving situations. For example, the control system 100 can operate the vehicle 10 by autonomously steering, accelerating, and braking the vehicle 10 as the vehicle progresses to a destination. The control system 100 can perform vehicle control actions (e.g., braking, steering, accelerating) and route planning using sensor information, as well as other inputs (e.g., transmissions from remote or local human operators, network communication from other vehicles, etc.).

In an example of FIG. 1, the control system 100 includes a computer or processing system which operates to process sensor data that is obtained on the vehicle with respect to a road segment upon which the vehicle 10 operates. The sensor data can be used to determine actions which are to be performed by the vehicle 10 in order for the vehicle 10 to continue on a route to a destination. In some variations, the control system 100 can include other functionality, such as wireless communication capabilities, to send and/or receive wireless communications with one or more remote sources. In controlling the vehicle 10, the control system 100 can issue instructions and data, shown as commands 85, which programmatically controls various electromechanical interfaces of the vehicle 10. The commands 85 can serve to control operational aspects of the vehicle 10, including propulsion, braking, steering, and auxiliary behavior (e.g., turning lights on).

The AV 10 can be equipped with multiple types of sensors 101, 103, 105, which combine to provide a computerized perception of the space and environment surrounding the vehicle 10. Likewise, the control system 100 can operate within the AV 10 to receive sensor data from the collection of sensors 101, 103, 105, and to control various electromechanical interfaces for operating the vehicle on roadways.

In more detail, the sensors 101, 103, 105 operate to collectively obtain a complete sensor view of the vehicle 10, and further to obtain situational information proximate to the vehicle 10, including any potential hazards in a forward operational direction of the vehicle 10. By way of example, the sensors 101, 103, 105 can include multiple sets of cameras sensors 101 (video camera, stereoscopic pairs of cameras or depth perception cameras, long range cameras), remote detection sensors 103 such as provided by radar or LIDAR, proximity or touch sensors 105, and/or sonar sensors (not shown).

Each of the sensors 101, 103, 105 can communicate with the control system 100 utilizing a corresponding sensor interface 110, 112, 114. Each of the sensor interfaces 110, 112, 114 can include, for example, hardware and/or other logical component which is coupled or otherwise provided with the respective sensor. For example, the sensors 101, 103, 105 can include a video camera and/or stereoscopic camera set which continually generates image data of an environment of the vehicle 10. As an addition or alternative, the sensor interfaces 110, 112, 114 can include a dedicated processing resource, such as provided with a field programmable gate array ("FPGA") which can, for example, receive and/or process raw image data from the camera sensor.

In some examples, the sensor interfaces 110, 112, 114 can include logic, such as provided with hardware and/or programming, to process sensor data 99 from a respective sensor 101, 103, 105. The processed sensor data 99 can be outputted as sensor data 111. As an addition or variation, the control system 100 can also include logic for processing raw or pre-processed sensor data 99.

According to one implementation, the vehicle interface subsystem 90 can include or control multiple interfaces to control mechanisms of the vehicle 10. The vehicle interface subsystem 90 can include a propulsion interface 92 to electrically (or through programming) control a propulsion component (e.g., an accelerator pedal), a steering interface 94 for a steering mechanism, a braking interface 96 for a braking component, and a lighting/auxiliary interface 98 for exterior lights of the vehicle. The vehicle interface subsystem 90 and/or the control system 100 can include one or more controllers 84 which can receive one or more commands 85 from the control system 100. The commands 85 can include route information 87 and one or more operational parameters 89 which specify an operational state of the vehicle 10 (e.g., desired speed and pose, acceleration, etc.).

The controller(s) 84 can generate control signals 119 in response to receiving the commands 85 for one or more of the vehicle interfaces 92, 94, 96, 98. The controllers 84 can use the commands 85 as input to control propulsion, steering, braking, and/or other vehicle behavior while the AV 10 follows a current route. Thus, while the vehicle 10 actively drives along the current route, the controller(s) 84 can continuously adjust and alter the movement of the vehicle 10 in response to receiving a corresponding set of commands 85 from the control system 100. Absent events or conditions which affect the confidence of the vehicle 10 in safely progressing along the route, the control system 100 can generate additional commands 85 from which the controller(s) 84 can generate various vehicle control signals 119 for the different interfaces of the vehicle interface subsystem 90.

According to examples, the commands 85 can specify actions to be performed by the vehicle 10. The actions can correlate to one or multiple vehicle control mechanisms (e.g., steering mechanism, brakes, etc.). The commands 85 can specify the actions, along with attributes such as magnitude, duration, directionality, or other operational characteristic of the vehicle 10. By way of example, the commands 85 generated from the control system 100 can specify a relative location of a road segment which the AV 10 is to occupy while in motion (e.g., change lanes, move into a center divider or towards shoulder, turn vehicle, etc.). As other examples, the commands 85 can specify a speed, a change in acceleration (or deceleration) from braking or accelerating, a turning action, or a state change of exterior lighting or other components. The controllers 84 can translate the commands 85 into control signals 119 for a corresponding interface of the vehicle interface subsystem 90. The control signals 119 can take the form of electrical signals which correlate to the specified vehicle action by virtue of electrical characteristics that have attributes for magnitude, duration, frequency or pulse, or other electrical characteristics.

In an example of FIG. 1, the control system 100 can include a route planner 122, event logic 124, and a vehicle control 128. The vehicle control 128 represents logic that converts alerts of event logic 124 ("event alert 135") into commands 85 that specify a vehicle action or set of actions.

Additionally, the route planner 122 can select one or more route segments that collectively form a path of travel for the AV 10 when the vehicle 10 is on a current trip (e.g., servicing a pick-up request). In one implementation, the route planner 122 can specify route segments 131 of a planned vehicle path which defines turn by turn directions for the vehicle 10 at any given time during the trip. The route planner 122 may utilize the sensor interface 110 to receive GPS information as sensor data 111. The vehicle control 128 can process route updates from the route planner 122 as commands 85 to progress along a path or route using default driving rules and actions (e.g., moderate steering and speed).

With respect to an example of FIG. 1, the event logic 124 can trigger a response to a detected event. A detected event can correspond to a roadway condition or obstacle which, when detected, poses a potential hazard or threat of collision to the vehicle 10. By way of example, a detected event can include an object in the road segment, heavy traffic ahead, and/or wetness or other environmental conditions on the road segment. The event logic 124 can use sensor data 111 from cameras, LIDAR, radar, sonar, or various other image or sensor component sets in order to detect the presence of such events as described. For example, the event logic 124 can detect potholes, debris, objects projected to be on a collision trajectory, and the like. Thus, the event logic 124 can detect events which enable the control system 100 to make evasive actions or plan for any potential threats.

When events are detected, the event logic 124 can signal an event alert 135 that classifies the event and indicates the type of avoidance action to be performed. For example, an event can be scored or classified between a range of likely harmless (e.g., small debris in roadway) to very harmful (e.g., vehicle crash may be imminent). In turn, the vehicle control 128 can determine a response based on the score or classification. Such response can correspond to an event avoidance action 145, or an action that the vehicle 10 can perform to maneuver the vehicle 10 based on the detected event and its score or classification. By way of example, the vehicle response can include a slight or sharp vehicle maneuvering for avoidance using a steering control mechanism and/or braking component. The event avoidance action 145 can be signaled through the commands 85 for controllers 84 of the vehicle interface subsystem 90.

When an anticipated dynamic object of a particular class moves into position of likely collision or interference, some examples provide that event logic 124 can signal the event alert 135 to cause the vehicle control 128 to generate commands that correspond to an event avoidance response 145. For example, in the event of a bicycle crash in which the bicycle (or bicyclist) falls into the path of the vehicle 10, event logic 124 can signal the event alert 135 to avoid the collision. The event alert 135 can indicate (i) a classification of the event (e.g., "serious" and/or "immediate"), (ii) information about the event, such as the type of object that generated the event alert 135, and/or information indicating a type of action the vehicle 10 should take (e.g., location of object relative to path of vehicle, size or type of object, etc.). The vehicle control 128 can use information provided with the event alert 135 to perform an event avoidance response 145 based on the event alert 135.

Figure 2:
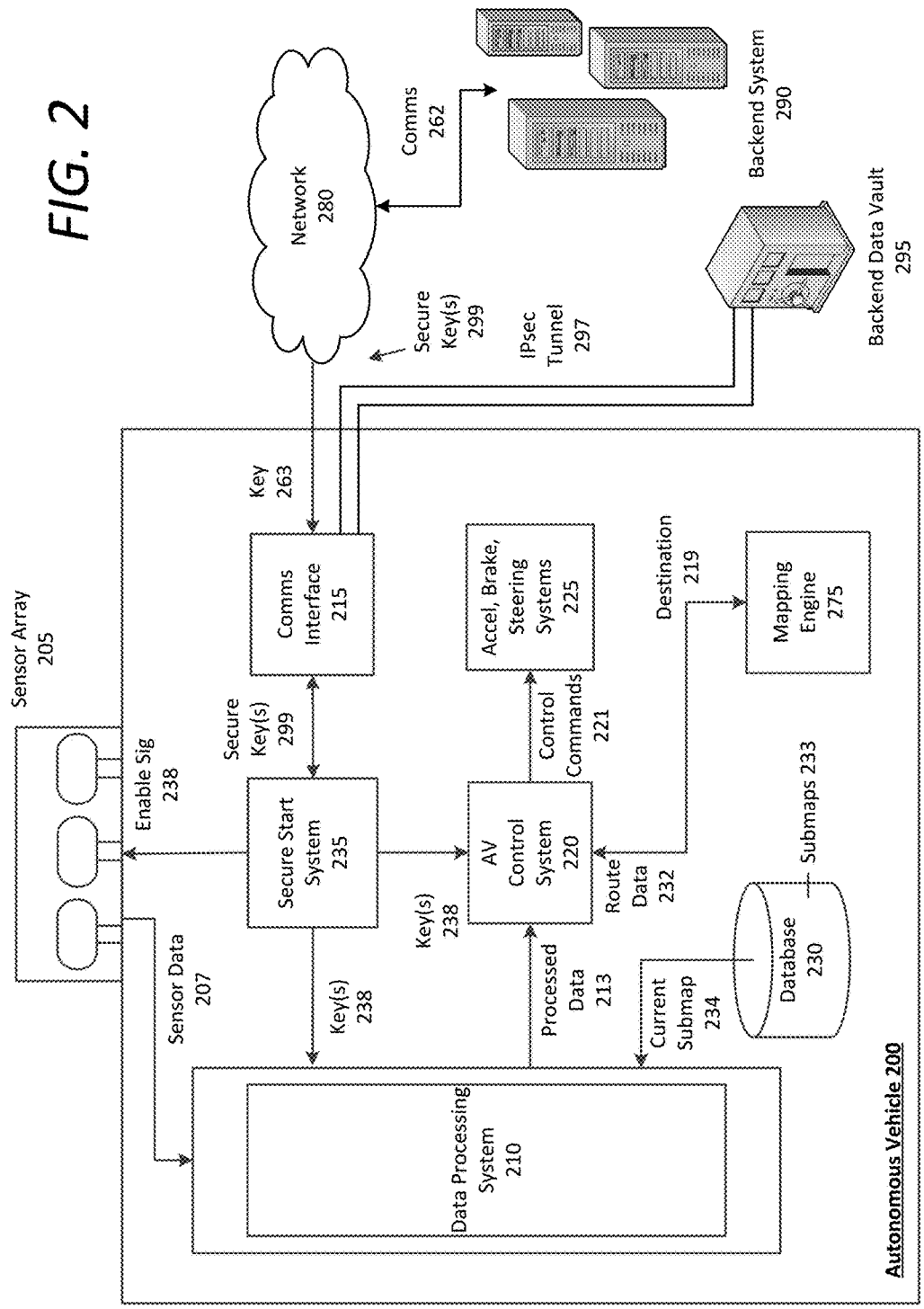
FIG. 2 is a block diagram illustrating an example autonomous vehicle including a secure start system, as described herein.

FIG. 2 is a block diagram illustrating an example autonomous vehicle including a secure start system, as described herein. The AV 200 shown in FIG. 2 can include some or all aspects and functionality of the AV 10 described with respect to FIG. 1. Referring to FIG. 2, the AV 200 can include a sensor array 205 that can provide sensor data 207 to an on-board data processing system 210. As described herein, the sensor array 205 can include any number of active or passive sensors that continuously detect a situational environment of the AV 200. For example, the sensor array 205 can include a number of camera sensors (e.g., stereo cameras), LIDAR sensor(s), proximity sensors, radar, and the like. The data processing system 210 can utilize the sensor data 207 to detect the situational conditions of the AV 200 as the AV 100 travels along a current route. For example, the data processing system 210 can identify potential obstacles or road hazards—such as pedestrians, bicyclists, objects on the road, road cones, road signs, animals, etc.—in order to enable an AV control system 220 to react accordingly.

In certain implementations, the data processing system 210 can utilize data sub-maps 233 stored in a database 230 of the AV 200 (or accessed remotely from the backend system 290 via the network 280) in order to perform localization and pose operations to determine a current location and orientation of the AV 200 in relation to a given region (e.g., a city). In some examples, one or more of the data processing system 210, the AV control system 220, and/or the sensor array 205 can be initialized when the AV 200 initiates an autonomous drive mode. The data processing system 210, AV control system 220, and/or a secure start system 235 of the AV 200 can execute an AV operating system (AVOS) that can function to enable communications (e.g., in a basic mode), enable full autonomy of the AV 200 (e.g., in a full autonomous mode), and/or enable general infrastructure functions with the backend system 290 (e.g., in a partial mode). In certain examples, the data processing system 210 and/or AV control system 220 can comprise a compute stack including a plurality of drives that process the sensor data 207 to operate the acceleration, braking, and steering systems 225 (i.e., operate the AV 200 in fully autonomous mode). In such examples, upon initial boot-up of the AV 200, a verification and/or decryption process may be required in order to enable the plurality of drives to execute the AVOS in full autonomous mode to enable the various functions of the AV 200 (e.g., autonomous drive functions). Thus, the secure start system 235 of the AV 200 can establish one or more communication sessions with the backend system 290 to unlock a number of functions of the AV 200 (e.g., autonomous drive functions), as described below.

In one example, a number of the drives (e.g., drive containing full autonomous file systems) can be encrypted. Thus, a set of decryption keys 299 can be retrieved from the backend system 290 to decrypt the drives themselves. In variations, some or all of the drives of the compute stack can remain unencrypted, and the AVOS itself can be encrypted and cryptographically signed. In many aspects, the AVOS can comprise a number of encrypted and compressed file systems (e.g., SquashFS images) that, when decrypted and verified, can be executed to enable the basic, partial, or full autonomous modes respectively. Each encrypted file system can require a corresponding key or multiple keys to unlock its function. For example, the encrypted autonomous file system necessary for full autonomy can require one or more of a validation key, an autonomous key, and/or a log key stored in a backend data vault 295 accessible only via secured, encrypted communications (e.g., via IPsec tunnel). As described herein, an authentication process may be required in order to ultimately retrieve the set of decryption keys in order to enable full autonomy for the AV 200.

In many aspects, the data sub-maps 231 in the database 230 can comprise previously recorded sensor data, such as stereo camera data, radar maps, and/or point cloud LIDAR maps. In fully autonomous mode, the data sub-maps 231 can enable the data processing system 210 to compare the sensor data 207 from the sensor array 205 with a current data sub-map 238 to identify obstacles and potential road hazards in real time. The data processing system 210 can provide the processed sensor data 213—identifying such obstacles and road hazards—to the AV control system 220, which can react accordingly by operating the steering, braking, and acceleration systems 225 of the AV 200 to perform low level maneuvering.

In many implementations, the AV control system 220 can receive a destination 219 from, for example, a user interface (not shown) of the AV 200. The user interface can include any number of touch-screens, voice sensors, mapping resources, etc. that enable a passenger to provide a passenger input indicating the destination 219. For example, the passenger can type the destination 219 into a mapping engine 275 of the AV 200, or can speak the destination 219 into a user interface. Additionally or alternatively, the AV 200 can include a communications interface 215 that can connect the AV 200 to a network 280 to communicate with a backend system 290 to receive invitations to service a pick-up or drop-off request. Such invitations can include the destination 219 (e.g., a pick-up location), and can be received by the AV 200 as a communication over the network 280 from the backend system 290. In many aspects, the backend system 290 can be a transport arrangement system that manages routes and/or facilitates transportation for users using a fleet of autonomous vehicles throughout a given region. In such aspects, the backend transport arrangement system can be operative to facilitate passenger pick-ups and drop-offs to generally service pick-up requests, facilitate delivery such as packages or food, and the like.

Based on the destination 219 (e.g., a pick-up location), the AV control system 220 can utilize the mapping engine 275 to receive route data 232 indicating a route to the destination 219. In variations, the mapping engine 275 can also generate map content dynamically indicating the route traveled to the destination 219. The route data 232 and/or map content can be utilized by the AV control system 220 to maneuver the AV 200 to the destination 219 along the selected route. For example, the AV control system 220 can dynamically generate control commands 221 for the autonomous vehicle's steering, braking, and acceleration systems 225 to actively drive the AV 200 to the destination 219 along the selected route. Optionally, the map content showing the current route traveled can be streamed to the interior user interface so that the passenger(s) can view the route and route progress in real time.

In many examples, while the AV control system 220 operates the steering, braking, and acceleration systems 225 along the current route on a high level, and the processed data 213 provided to the AV control system 220 can indicate low level occurrences, such as obstacles and potential hazards to which the AV control system 220 can make decisions and react. For example, the processed data 213 can indicate a pedestrian crossing the road, traffic signals, stop signs, other vehicles, road conditions, traffic conditions, bicycle lanes, crosswalks, pedestrian activity (e.g., a crowded adjacent sidewalk), and the like. The AV control system 220 can respond to the processed data 213 by generating control commands 221 to reactively operate the steering, braking, and acceleration systems 225 accordingly.

According to various implementations described herein, the backend system 290 can comprise an authentication system including authentication logs to establish secure and private communication sessions with the AV 200. In certain examples, the backend system 290 can include or otherwise command access to a backend data vault 295 that stores a set of secure decryption keys 299 for the AV 200, as described herein. In one example, upon startup, the secure start system 235 can establish a communications session (e.g., an HTTPS communications session) with the backend system 290 over the network 280. The secure keys 299 for the AV 200 can be stored in the backend data vault 295, and can be accessible via a private encrypted communications session (e.g., an IPsec tunnel 297).

In many aspects, subsystems of the AV 200 can be initiated in response to decryption keys 238 from the secure start system 235 being utilized to decrypt the drives of the compute stack (e.g., of the data processing system 210 and/or AV control system 220). In variations, the decryption keys 238 can be utilized to decrypt compressed image files of the AVOS (e.g., the autonomous SquashFS image) to enable autonomy of the AV 200. In certain variations, a user can insert a boot-loader into an input interface of the secure start system 235 to initiate a decryption process to enable various functions and subsystems of the AV 200. The secure start system 235 or the data processing system 210 can include a switching module connecting the secure start system 235 to a compute stack that enables autonomous functions for the AV 200. In one example, the compute stack can include a number of encrypted drives, which the secure start system 235 can decrypt using a set of decryption keys 299. In another example, the compute stack can unlock and execute the compressed and encrypted AVOS files using the set of decryption keys 299. Thus, the functions of the data processing system 210 and/or the AV control system 220 can remain locked until the secure start system 235 completes the decryption process.

In certain examples, the compute stack (e.g., the processing resources of the data processing system 210) can run an operating system that runs in multiple modes (e.g., a basic, partial, and full autonomous mode). Upon insertion of the boot-loader (e.g., a USB drive including a basic decryption key for the secure start system 235), the operating system can initiate in the basic mode. In the basic mode, the operating system can have minimal configuration to boot-up. For example, an initial decryption of the secure start system 235 can enable network connectivity of the AV 200 (e.g., initiate the communications interface 215). In some examples, the basic mode can further enable a user to start the AV 200 and utilize the acceleration, braking, and steering systems 225 of the AV 200 (e.g., in a human drive mode) without enabling autonomous functionality. To prevent unauthorized use, the boot-loader can be customized or manufactured for use solely with the AV 200 and thus only decrypt the specific secure start system 235 of that particular AV 200 to initiate boot-up of the AVOS.

In variations, the secure start system 235 can store the basic decryption key in write protected memory (e.g., flash memory). Upon startup of the AV 200, the basic decryption key can decrypt one or more compressed image files of the AVOS to enable the basic mode, as described in detail below. For example, the basic decryption key can enable the communications interface 215 (e.g., a communications router) to communicate with the backend system 290.

In many aspects, once decrypted and booted, the secure start system 235 can initiate a communications session with a backend system 290 (e.g., an HTTPS session) to initiate communications 262. For example, the secure start system 235 can utilize the communications interface 215 to transmit credentials which the backend system 290 can authenticate. In one example, the credentials can include an application ID, a username and password, biometric information of the operator or rider, an access token, and/or other unique identifiers for the rider and/or the AV 200.

Once the credentials are authenticated by the backend system 290, the secure start system 235 can receive a secure key 263 from the backend system 290 over the network 280. In many examples, the secure key 263 is an IPsec tunnel key to enable the secure start system 235 to establish a private communications session (e.g., an IPsec tunnel 297) with a backend data vault 295 of the backend system 290. In many examples, the backend data vault 295 is not Internet connected and thus only accessible via private network communications. Over the private communications session (e.g., the IPsec tunnel 297), the secure start system 235 can request or retrieve a set of secure keys 299 to unlock the encrypted drives and/or the encrypted AVOS image files in the compute stack. In one example, the secure start system 235 utilizes the set of secure keys 299 to initiate a decryption process to decrypt each drive of the compute stack, and/or each encrypted AVOS image, to initialize full autonomous functions for the AV 200, as described in further detail below.

Figure 3A:
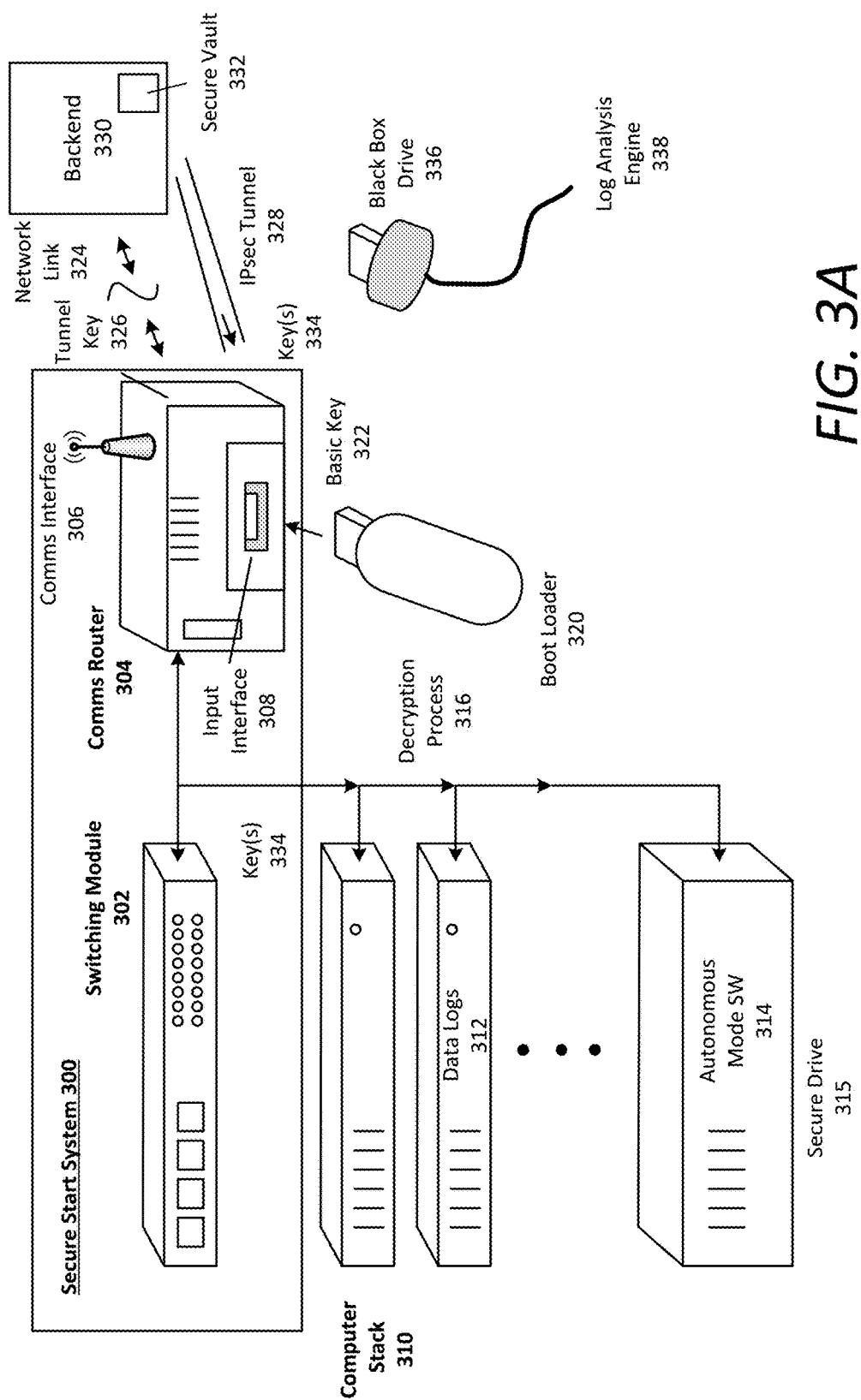
FIG. 3A is a block diagram illustrating an example secure start system for an autonomous vehicle, in accordance with examples described herein.

FIG. 3A is a block diagram illustrating an example secure start system for an autonomous vehicle, in accordance with examples described herein. In the examples described with respect to FIG. 3A, reference may be made to like references characters representing various features shown and described with respect to FIG. 2. Referring to FIG. 3A, a secure start system 300 can include a switching module 302 and a communications router 304. The switching module 302 can connect to a compute stack 310 comprising a number of encrypted drives that enable the various functions of the AV 200. For example, the compute stack 310 can run the data processing system 210 and/or the AV control system 220 of the AV 200. Additionally, the various drives of the compute stack 310 can be connected to the switching module 302. In accordance with examples described herein, the AVOS executable by the compute stack can run in at least a basic mode with minimal configuration (e.g., enabling communications and human drive on the AV 200), and a fully autonomous mode in which the AV 200 can autonomously operate through road traffic to inputted destinations without human intervention.

According to examples described herein, the communications router 304 can include an input interface 308 (e.g., a USB port) into which a boot-loader 320 or authentication resource may be inserted. The boot-loader 320 can include a basic decryption key to initiate the hard drive (e.g., an encrypted router drive) of the communications router 304. When the communications router 304 is booted, a communications interface 306 (e.g., a wireless network interface) can be initiated.

Additionally, once initiated, the communications router 304 can establish a network link 324 with a backend system 330. In one example, the communications router 304 can communicate with the backend system 330 over network link 324 using a secure network protocol, such as HTTPS. Using the network link 324, the communications router 304 can transmit the credentials to the backend system 330 and request a tunnel key 326. The backend system 330 can authenticate the credentials using, for example, an access list comparing the rider and/or AV 200 to an IP address or other identifier of the secure start system 300. If not authenticated, then the backend system 330 can cease communications with the communications router 304 and optionally transmit an alert (e.g., to an administrator or authority) that unauthorized access has been attempted. Additionally or alternatively, the backend system 330 can disable the AV 200 (e.g., by disabling application identifiers for the AV 200 and preventing the AV 200 from receiving the tunnel key 326 and/or decryptions keys 334). However, if the credentials are authenticated (e.g., matches backend records for the AV 200), then the backend system 330 can transmit the tunnel key 326 to the communications router 304.

Once the tunnel key 326 (e.g., a cryptographic IPsec tunnel key) is received, the communications router 304 can establish an IPsec tunnel 328 (or other private communications session) to a secure vault 332 of the backend system 330. In one example, the communications router 304 stores the tunnel key 326 until an explicit request is made by the switching module 302 to retrieve the set of decryption keys 353 from the secure vault 332 to enable the autonomous mode for the AV 200. For example, a user or human driver can select an autonomous drive mode on a user interface (e.g., a display screen feature or button). In response to the selection, the switching module 302 can request the set of decryption keys 334 to decrypt the compute stack 310 in order to initiate the autonomous mode. Additionally or alternatively, the communications router 304 can utilize the tunnel key 326 to establish the IPsec tunnel 328 in order to retrieve the set of decryption keys 334 from the secure vault 332. As described herein, the secure vault 332 may be accessed only via a private communications session, which precludes any unauthorized third-party access.

The switching module 302 can comprise an Ethernet switch connecting to various networked machines of the AV 200. In one example, the switching module is a 6U VPX form factor switch connecting to each drive of the compute stack 310. In variations, the compute stack 310 can include a secure drive 320 (or multiple secure drives) that contains proprietary autonomous mode file system 314 required to enable autonomous functions for the AV 200. In many examples, upon receiving the set of decryption keys 334, the switching module 302 can initiate a decryption process 316, using the decryption keys to initiate each drive in the compute stack 310. Thus, if a particular key is missing, then the switching module 302 can terminate the decryption process 316, thereby preventing the full autonomous mode from initiating. However, if all decryption keys 334 are received, the switching module 302 can complete the decryption process 316 and enable execution of the autonomous mode file system 314 in the secure drive 320.

In variations, the compute stack 310 can include encrypted and compressed image files of the AVOS as opposed to the drives themselves being encrypted. Thus, the decryption process 316, utilizing the set of decryption keys 334, can decrypt and/or verify each AVOS image file, which can then be executed by the compute stack 310, as described in detail below. In many aspects, the secure drive 315 can remain unencrypted, but can store an encrypted autonomous AVOS image that enables full autonomous mode of the AV 200. A specified key (e.g., an "autonomous key") of the set of decryption keys 334 can be required to decrypt the autonomous AVOS image, which can be received by way of the IPsec tunnel 328 described herein. Additionally, a verification key of the set of decryption keys 334 may also be required to verify that the autonomous AVOS image was cryptographically signed by a known authority (e.g., the backend system 330).

Execution of the autonomous mode file system 314 can be performed automatically or responsive to a user input, and can initiate the autonomous mode on the AV 200. As an example, once the secure drive 315 (or the autonomous AVOS image) is decrypted, the autonomous mode file system 314 (i.e., full autonomous mode of the AVOS) can be executed or otherwise utilized by the AV subsystems to perform autonomous driving for the AV 200. Accordingly, the autonomous mode file system 314 can unlock or otherwise initiate the functions of the AV control system 220 and/or the on-board data processing system 210 of the AV 200 to initiate the autonomous drive mode.

According to certain implementations, when the AV 200 is powered off, any runtime changes made to the operating system running on the compute stack 310 are wiped automatically. In variations, the AVOS consists of a number of compressed read-only file systems in which any runtime changes are wiped when the secure start system 300 unmounts the autonomous AVOS file system.

In some aspects, the compute stack 310 can include data logs 312 to record data from the AV subsystems and other sensors (e.g., tire pressure sensors, proximity sensors, accelerometers or gyroscopic sensors) for black box purposes. The data logs 312 can record data indicating a particular drive session of the AV 200. In one example, the data logs 312 can implement an additional full disk encryption, and may require an additional decryption key (i.e., a log key) in order to retrieve the session data. In certain circumstances (e.g., after an accident, a test run, or during servicing), a black box drive 336, or log reader, can be inserted into the input interface 308 to retrieve the session data from the data logs 312. In certain variations, the black box drive 365 can include a black box decryption key (e.g., a log key) that decrypts the data logs 330 to retrieve the session data. In other variations, the log key can decrypt an encrypted and compressed log file system (e.g., a log SquashFS) to enable the black box drive 336 to retrieve the session data.

The session data can be analyzed by a log analysis engine 338 to, for example, determine the cause of an accident or provide valuable data that may be processed to identify AV performance. Additionally or alternatively, the log analysis engine 338 can process the session data in real time as the AV 200 travels along a current route. For example, once autonomous drive is initiated, a user can remove the boot-loader 320 and insert the black box drive 336 to monitor the various subsystems and sensors of the AV 200. The log analysis engine 338 can further monitor the AV subsystems to dynamically determine whether each of the subsystems operate within nominal parameters.

Various aspects described with respect to FIGS. 1 through 3A provide security guarantees to ensure only authorized access and use of the AV 200. For example, if any of the drives in the compute stack 310 are stolen, only a proper authentication key and secure/private communications with the backend system 330 and secure vault 332 will enable decryption of the stolen drive. Furthermore, the router drive of the communications router 304 can also be encrypted. Thus, if the communications router 304 is stolen, only a corresponding boot-loader 320 with a proper router decryption key can enable the communications router 304 to boot-up.

Additionally, if the AV 200 itself is stolen, the communications router 304, 345 will require the boot-loader 320 (including the router drive decryption key) to initiate communications with the backend system 330, 360, and at least autonomous functions will remain locked. Consequently, at any given time, an owner or operator of the AV 200, or the AV 200 itself, may report any theft or malfunction to the backend system 330, 360, which, in some examples, can implement a number of tracking and/or other emergency or backup solutions.

If the AV 200 and the boot-loader 320 are stolen, the communications router 304 may be booted up successfully. However, the backend system 330 can revoke the corresponding unique identifier (e.g., a application ID or serial number) from having valid vault credentials. Accordingly, in the revoked state, at least the autonomous functions of the AV 200 will remain locked since the communications router 304 will not be able to establish the IPsec tunnel 328, much less retrieve the set of decryption keys 334 from the secure vault 332.

Still further, if the code and/or the compressed, read-only file system (e.g., the SquashFS image) for the cryptographically signed operating system is stolen, the communications router 304 still requires access to the secure vault 332 to retrieve the set of decryption keys 334, which is only accessible after authentication by the backend system 330. In various implementations, when the credentials are revoked, even with the code for the AVOS, at least the autonomous functions of the AV 200 will remain locked.

Figure 3B:
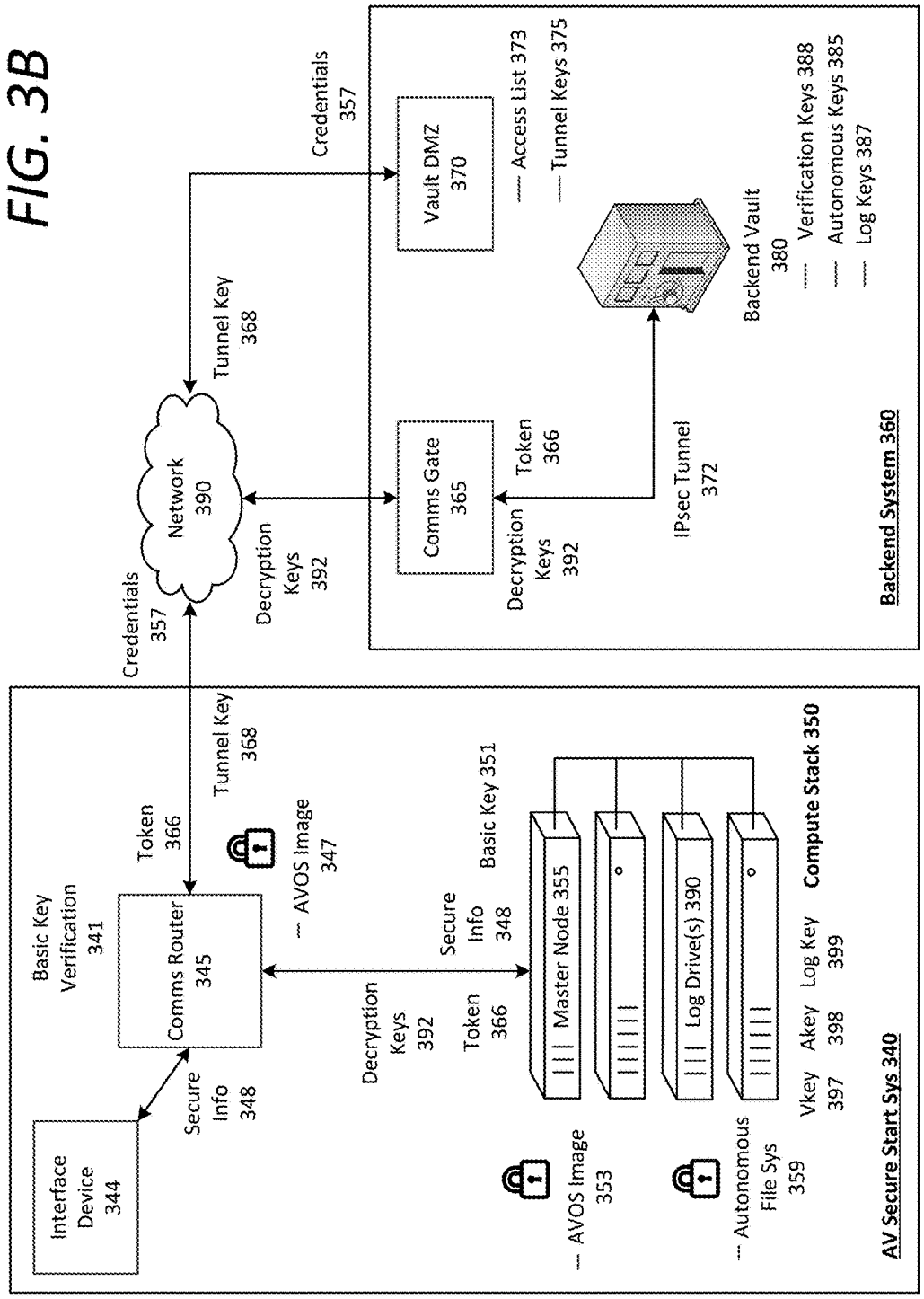
FIG. 3B is a block diagram illustrating an example secure start system in communication with a backend system, in accordance with examples described herein.

FIG. 3B is a block diagram illustrating an example secure start system in communication with a backend system, in accordance with examples described herein. Various aspects described below with respect to FIG. 3B may be implemented in combination with aspects described with respect to FIGS. 1 through 3A. Furthermore, in the below description of FIG. 3B, reference may be made to like reference characters representing feature described with respect to FIG. 2. Referring to FIG. 3B, an AV secure start system 340 can include a communications router 345 and a compute stack 350 that, when executing a verified and decrypted AVOS 347, 353 and an additionally verified and decrypted autonomous file system 359 (e.g., full autonomous mode of the AVOS), can process sensor data 207 from the AV's sensor array 205 and autonomously operate the AV 200.

In many aspects, a basic key verification 341 can be required for the initial boot-up of the communications router 345. Upon startup of the AV 200, the communications router 345 can utilize the basic key 341 to verify that the AVOS image 347 is cryptographically signed by an authority entity (e.g., the backend system 360) to initiate communications. Additionally, the compute stack 310 can also require basic key verification 351 prior to booting up and executing the AVOS image 353 in basic mode (e.g., limited to network communications). In some examples, the basic keys 341, 351 can be stored in memory of the secure start system 340 (e.g., in read-only, write-protected memory). Additionally, the basic keys 341, 351 can comprise one or more public keys of a public/private key pair, where the private decryption key is securely stored at the backend system 360.

Once verified and operating the AVOS 347, 353 in basic mode, the secure start system 340 can prompt a rider or a backend management entity to input secure information 348 to initiate a verification and decryption process to enable full autonomous mode of the AVOS. In some aspects, the secure information 348 can include two or more components for multi-factor authentication (e.g., 2FA) required by the backend system 360. In such aspects, the two or more components can comprise two or more of a username and password, a biometric scan, an authentication code, a token (e.g., a dedicated token), a mobile device identifier, a one-time passcode, or any other suitable factor for authenticating the rider and/or AV 200. In many examples, these credentials, along with the basic keys 341, 351 can comprise the root points of trust for the verification and decryption process.

According to examples, the secure information 348 can be inputted into an interface device 344 and transmitted to the communications router 345. In one example, the interface device 344 can be a mobile computing device (e.g., a mobile phone or tablet computer executing a designated application) connected to the communications router 345 (e.g., via a wired or wireless connection). In variations, the interface device 344 can be a display interface of the AV 200 itself.

In certain implementations, the compute stack 350 can comprise a master node 355 and a number of dependent nodes. In such implementations, the master node 355 can control communications with the backend system 360 via the communications router 345 by publishing such communications for transmission to the backend system 360 (e.g., via a switching module).

In certain examples, the communications router 345 can transmit credentials 357—comprising or based on the secure information 348—to the backend system 360 over a network 390. In some examples, the credentials 357 also include a unique identifier (e.g., an IP address of the interface device 344 or the secure start system 340) that enables the backend system 360 to authenticate the rider and/or the AV 200. In one implementation, the communications router 345 transmits the credentials 357 using a secure communications protocol (e.g., HTTPS). Additionally or alternatively, the communications router 345 can transmit the credentials to a vault demilitarized zone ("DMZ") 370 of the backend system 360. The vault DMZ 370 can include access lists 373 and tunnel keys 375 for establishing a private, encrypted link to the backend vault 380—which can house verification keys 388, autonomous keys 385, and log keys 387 for any number of autonomous vehicles managed by the backend system 360.

Upon receiving the credentials 357, the vault DMZ 370 can perform a lookup in the access lists 373 to determine whether the credentials 357 are valid. For example, the vault DMZ 370 can determine whether the credentials 357 match a known IP block of the secure start system 340 (e.g., of the master node 355 or interface device 344). If the credentials 357 are invalid, the vault DMZ 370 can transmit a notification to the interface device 344. If a certain number of attempts fail, the backend system 360 can revoke the credentials 357 to prevent further attempts to initiate autonomous drive. Additionally or alternatively, the backend system 360 can implement a security protocol by, for example, notifying authorities and/or tracking a location of the AV 200.

If the vault DMZ 370 determines that the credentials 357 are valid, the vault DMZ 370 can transmit a tunnel key 368 for the AV 200 to the communications router 345. The communications router 345 can utilize the tunnel key 368 to establish a private communications session (e.g., an IPsec tunnel 372) with the backend vault 380 via a communications gate 365 of the backend system 360. Over the IPsec tunnel 372, the compute stack 350 receive the set of decryption keys 392 to unlock the autonomous file system 359 and enable autonomous driving of the AV 200.

In certain implementations, additional steps are required to retrieve the decryption keys 392. In such implementations, once the IPsec tunnel 372 is established, the master node 355 can transmit the credentials 357 to the backend vault 380, which can verify the credentials 357 by way of multi-factor verification (e.g., 2FA). Upon verification, the backend vault 380 can transmit a token 366 (e.g., a time-limited token) to the master node 355. The master node 355 can then publish the token 366 to enable the secure start system 340 (e.g., a switching module of the secure start system 340) to retrieve the set of decryption keys 392 from the backend vault 380.

As provided herein, the set of decryption keys 392 can comprise one or more keys that unlock the autonomous file system 359 to enable the compute stack 350 to execute the AVOS in full autonomous mode. In certain implementations, the set of decryption keys 392 can include a verification key 397. In one aspect, the secure start system 340 can first verify the verification key 397 with the basic key 351. Thus, during key development, the verification key 397 can be cryptographically signed by the basic key 351 stored on the secure start system 340 (or the boot-loader 320 in the example implementations described with respect to FIG. 3A). Once verified, the secure start system 340 can utilize the verification key 397 to verify the autonomous file system 359 (e.g., the autonomous SquashFS).

As described herein, the autonomous file system 359 can be cryptographically signed and encrypted. Thus, the secure start system 340 can utilize the verification key 397 to verify that the autonomous file system 359 was cryptographically signed by the backend system 360. If verified, then the secure start system 340 can utilize an autonomous key 398 of the retrieved set of decryption keys 392 to decrypt the autonomous file system 359 and enable execution of the AVOS in full autonomous mode.

In some examples, the compute stack 350 can include one or more log drives 390 that can themselves be encrypted, or can execute a compressed, encrypted log drive file system after verification and/or decryption. In such examples, the set of decryption keys 392 can include a log key 399 to decrypt the log drives 390, or the encrypted and compressed log drive file system, to enable data logging for the AV 200. In certain implementations, the AV 200 cannot run autonomously without the log drives 390.

Once an autonomous driving session is complete, the secure start system 340 can unmount the autonomous file system 359, which can lock the autonomous mode of the AV 200. Furthermore, when the AV 200 powers down, the secure start system 340 can automatically unmount the AVOS images 347, 353 and remove the decryption keys 392 from memory.

A number of security guarantees are provided for the above examples described with respect to FIGS. 3A and 3B. For example, the drive of the compute stack 350 can contain no sensitive information, only the basic mode of the AVOS. Furthermore, the autonomous file system 359 (full autonomous mode of the AVOS) can be cryptographically signed and encrypted. Thus, without valid credentials 357, the communications router 345 cannot acquire the tunnel key 368 and the autonomous file system 359 cannot be decrypted. Still further, during emergencies (e.g., vehicle theft), the backend system 360 can patch into the secure start system 340 to disable the autonomous mode and/or revoke the credentials 357.

Methodology

Figure 4:
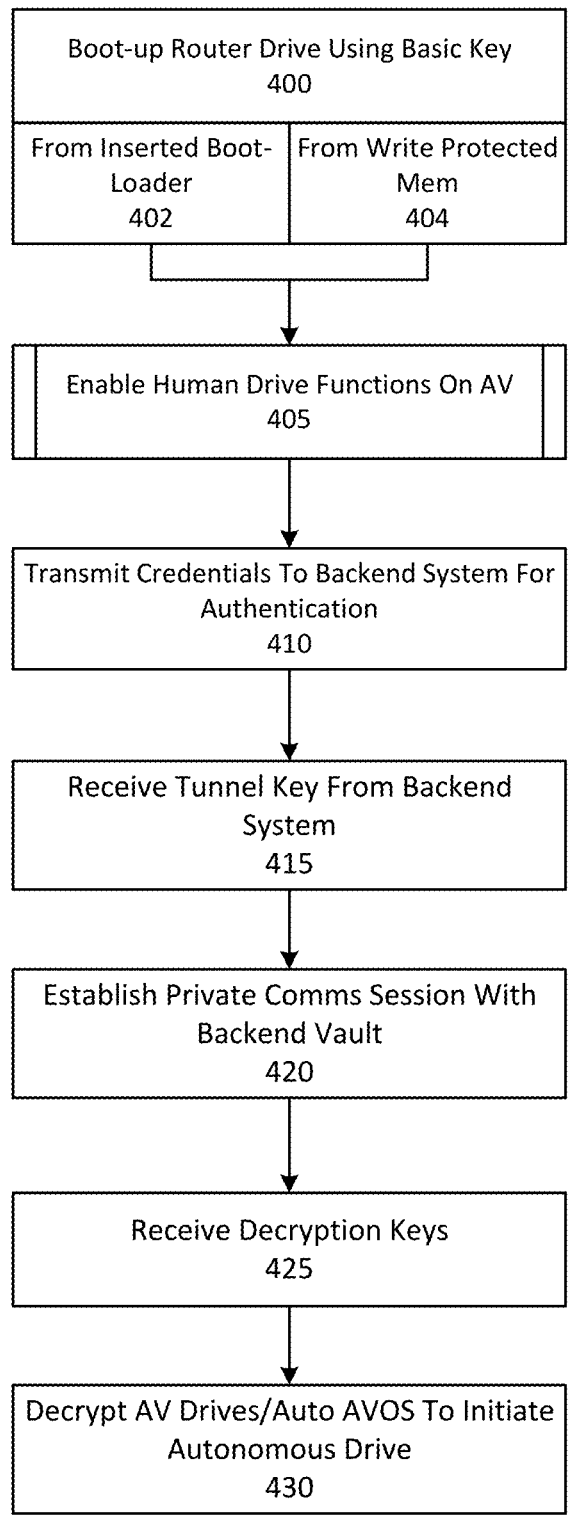
FIG. 4 is a flow chart describing an example method of enabling autonomous drive functions for an autonomous vehicle, in accordance with examples described herein.

FIG. 4 is a flow chart describing an example method of enabling autonomous drive functions for an autonomous vehicle, in accordance with examples described herein. In the below description of FIG. 4, reference may be made to like reference characters representing various features of FIGS. 2, 3A and/or 3B for illustrative purposes. For example, the method described with respect to FIG. 4 may be performed by an example secure start system 235, 300 implementing a boot-loader 320 shown and described in connection with FIG. 3A, and/or with the basic key 341 stored in write protected, read-only memory (e.g., flash memory) as shown and described with respect to FIG. 3B. Referring to FIG. 4, the secure start system 235 can boot-up the router drive of the communications router 304 using a basic decryption key 322, 341 (400). In one example, the secure start system 235 utilizes a basic key 322 stored on the inserted boot-loader 320 (402). Thus, the communications router 304 can include an input interface 308 (e.g., a USB port) to receive the boot-loader 320 and retrieve the decryption key 322 to decrypt the router drive and enable network communications. Alternatively, the secure start system 235 can utilize the decryption key 322 to verify and/or decrypt the AVOS image 347 in order to execute the AVOS in basic mode. Alternatively still, the secure start system 235 can verify and/or decrypt the AVOS image 347 using a basic key 341 stored in a memory of the secure start system 235 to execute the AVOS in basic mode, thereby enabling network communications (404). In addition to enabling communications, in one example, the AVOS basic mode can also enable human drive functions of the AV 200 (405).

Once network communications are enabled, the secure start system 235 can transmit credentials to a backend system 290 for authentication (410). In some examples, the credentials are included in the boot-loader 320. In variations, the credentials are inputted by a user via, for example, an input device 344. If the credentials are not authenticated by the backend system 290, then the process can terminate, or the user can instigate a limited number of attempts to authenticate. However, if the credentials are authenticated by the backend system 290, then the secure start system 235 can receive a tunnel key 326, 368 (e.g., a cryptographic key to set up a private communications session) from the backend system 290 (415). Using the tunnel key 326, 368, the communications router 304, 345 can establish a private communications session (e.g., an IPsec tunnel 328, 372) with a backend data vault 332, 380 (420). In one example, the secure start system 300 utilizes the tunnel key 326, 368 to perform a mutual authentication with the backend data vault 332, 380, and subsequently utilize cryptographic keys during the private communication session. In variations, the backend system 290 can further intervene to provide further authentication for the secure start system 235 to set up the private communications session. Once the private communications session is established, the communications router 304, 345 can receive a set of decryption keys 334, 392 from the backend data vault 358 (425). Thereafter, the secure start system 235 can utilize the set of decryption keys 334, 392 to decrypt the compute stack drives 310, or the full autonomous AVOS file system 359, to initiate or otherwise make available autonomous drive functions for the AV 200 (430).

Figure 5:
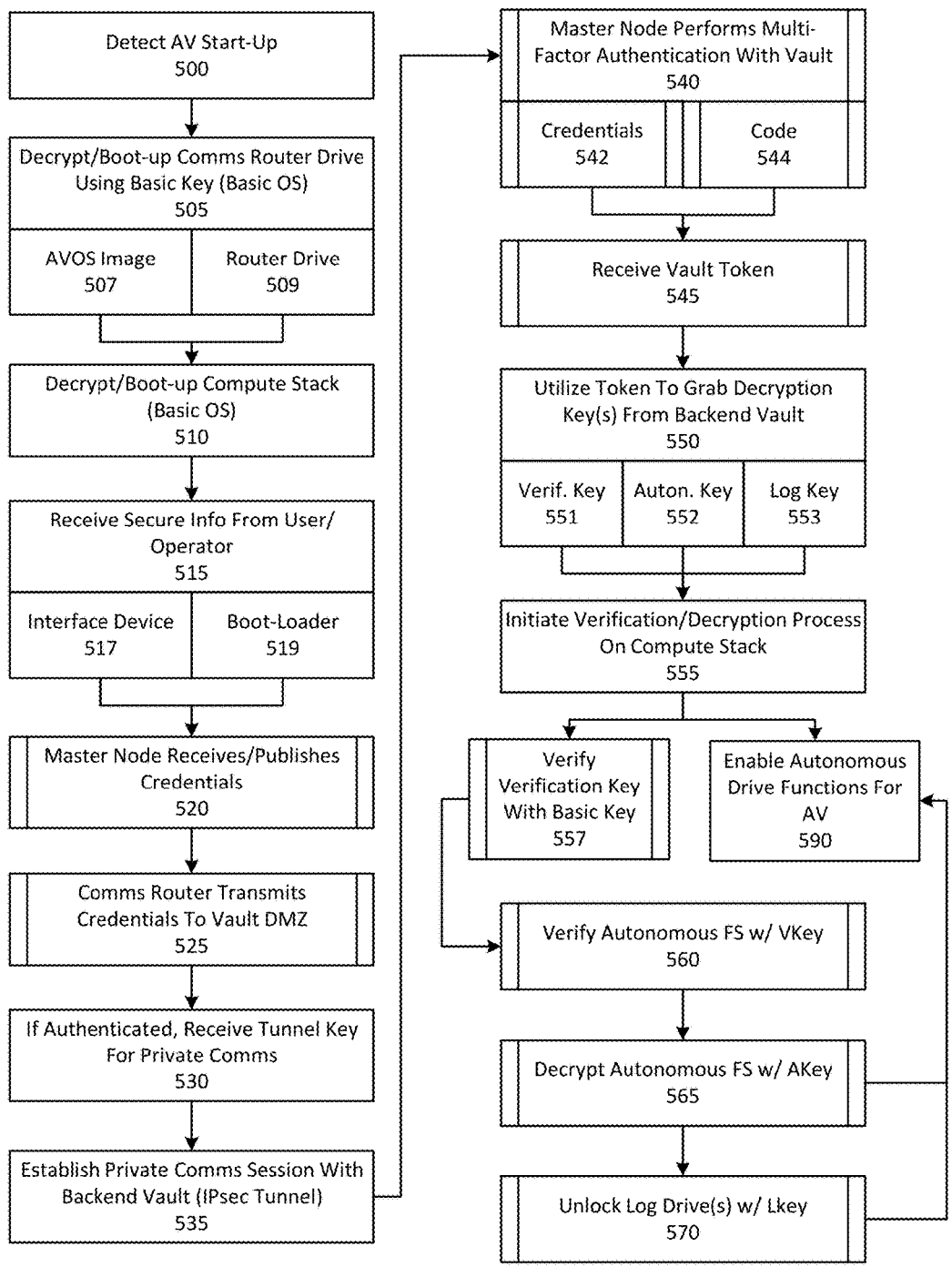
FIG. 5 is a flow chart describing another example method of enabling autonomous drive functions for an autonomous vehicle, in accordance with examples described herein.

FIG. 5 is a flow chart describing another example method of enabling autonomous drive functions for an autonomous vehicle, in accordance with examples described herein. In the below description of FIG. 5, reference may be made to like reference characters representing various features of FIGS. 2, 3A, and/or 3B for illustrative purposes. Furthermore, the method described with respect to FIG. 5 may be performed by an example secure start system 235, 300, 340 shown and described in connection with FIGS. 2, 3A, and 3B. Referring to FIG. 5, the secure start system 235 can initially detect startup of the AV 200 (500). In one example, utilizing a basic decryption key 322, the secure start system 235 can decrypt the router drive of the communications router 304 (509) to enable a basic mode of the AVOS (505). For example, the secure start system 235 can receive the basic key 322 from a boot-loader 320 inserted into an input interface 308 of the communications router 304. Alternatively, utilizing a basic key 341 (e.g., a verification key), the secure start system 235 can verify an AVOS image which enables execution of the AVOS in basic mode (507).

In certain implementations, the secure start system 235 can also utilize the basic key 322, 351 to verify an AVOS image 353 of the compute stack 350, and/or decrypt a number of drives of the compute stack 310 to execute the AVOS in basic mode (510). According to certain examples, the secure start system 235 can further receive secure information 348 from a user or operator of the AV 200 (515). In one example, the secure information 348 can be included in the inserted boot-loader 320 (519). In variations, the secure information 348 can be inputted by the user or operator via an interface device 344, such as a mobile computing device executing a designated application for enabling various functions of the AV 200 (517). In some examples, a master node 355 of the compute stack 350 receives the secure information 348 and publishes credentials 357 based on the secure information 348 for transmission to the backend system 290 by a switching module (520). Additionally or alternatively, the communications router 304, 345 can transmit the credentials 357 to a vault DMZ 370 of the backend system 290 (525) (e.g., via HTTPS).

If the credentials are authenticated by the backend system 290, then the secure start system 235 can receive or retrieve a tunnel key 326, 368 from the backend system 290 (530). Utilizing the tunnel key 326, 368, the secure start system 235 can establish a private communications session (e.g., an IPsec tunnel 328, 372) with a backend vault 332, 380 of the backend system 290 (535). In certain implementations, the master node 355 can perform a multi-factor authentication (e.g., 2FA) with the backend vault 332, 380—which requires multiple components of authentication (e.g., username and password, additional credentials (542), authentication codes (544), device identifier, etc.) (540). If the multi-factor authentication is valid, then the secure start system 235 can receive a time-limited vault token 366 for accessing the backend vault 332, 380 (545).

Utilizing the vault token 366, the secure start system 235 can retrieve a set of decryption keys 334, 392 from the backend vault 332, 380 (550). According to examples, the set of decryption keys 334, 392 can include one or more of a verification key 397 (551), an autonomous key 398 (552), and a log key 399 (553). Utilizing the set of decryption keys 334, 392, the secure start system 235 can initiate a verification and/or decryption process on the compute stack 310, 350 (555). In examples discussed with respect to FIG. 3A, the secure start system 300 can utilize the set of decryption keys 334 to decrypt the drives of the compute stack 310 to enable the autonomous drive functions of the AV 200 (590).

However, for examples described with respect to FIG. 3B, the secure start system 340 can initially verify the verification key 397 using the basic key 341 (557). In such examples, the verification key 397 can be previously cryptographically signed by the basic key 341. Additionally or alternatively, the secure start system 340 can utilize the verification key 397 to verify the autonomous file system 359 (e.g., full mode AVOS SquashFS) (560). For example, the verification key 397 can be utilized to verify that the autonomous file system 359 was cryptographically signed by a certificate authority of the backend system 290. Once verified, the secure start system 340 can decrypt the autonomous file system 359 using the autonomous key 398 (565), which can enable the compute stack 350 to execute full autonomous mode of the AVOS (590). In further implementations, the secure start system 340 can utilize the log key 399 to either decrypt the log drives 390, or decrypt compressed log drive file systems (e.g., SquashFS images) to enable data logging (570). Thereafter, the full autonomous drive functions of the AV 200 can be initiated (590). The log data in the log drives can be utilized to, for example, monitor AV performance, determine causes of anomalies, adapt and/or optimize Av performance, and the like.

According to examples described herein, when executing in full autonomous mode, all drives of the compute stack 310, 350 can be mounted. When the AV 200 powers down, the secure start system 235 can unmount the autonomous file system 359 and remove all keys 334, 392 from memory. Thus, any runtime changes during the AV session can be wiped on each reboot.

Hardware Diagram

Figure 6:
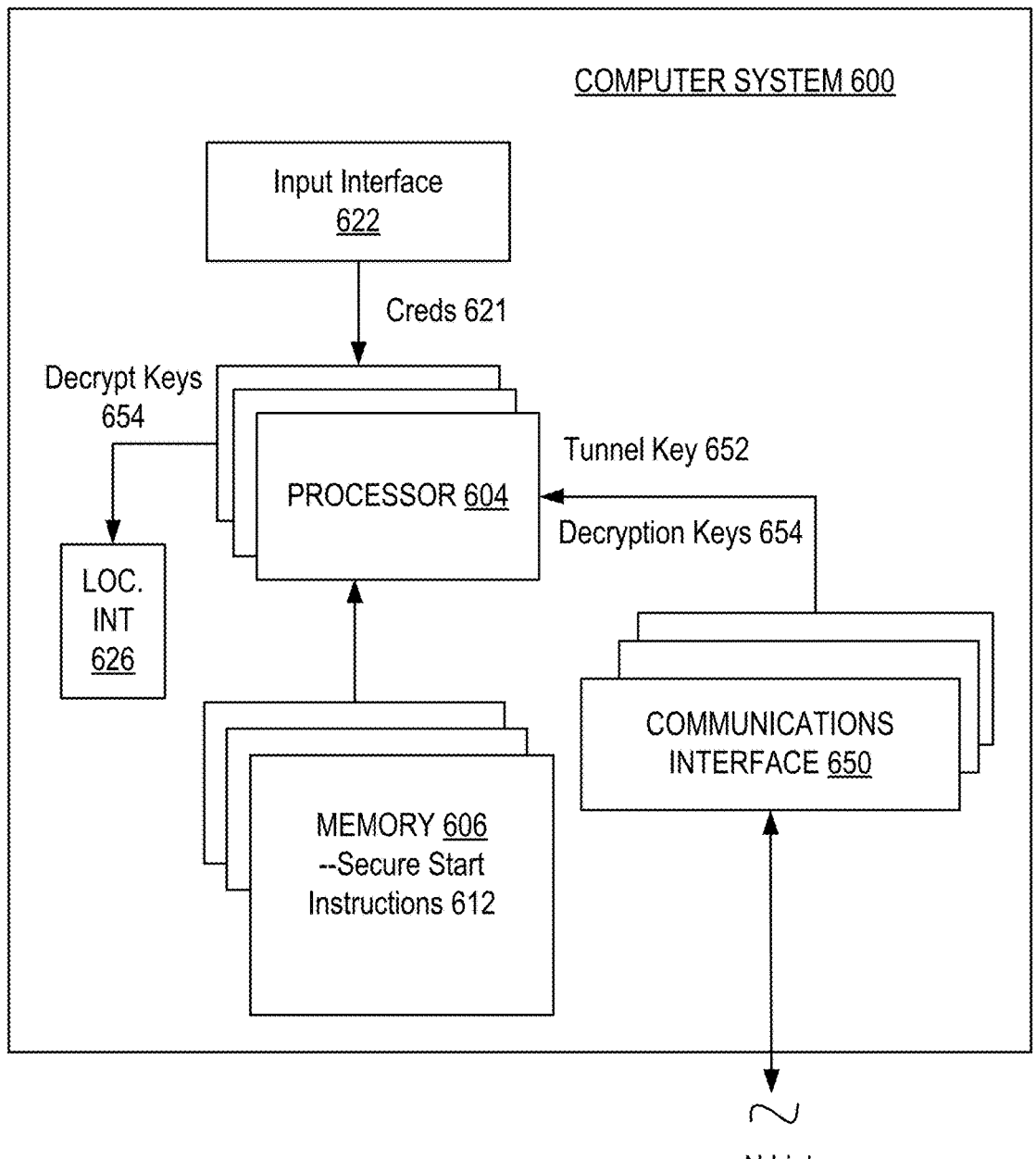
FIG. 6 shows a computer system upon which examples described herein may be implemented.

FIG. 6 shows a block diagram of a computer system on which examples described herein may be implemented. For example, the secure start systems 300, 340 shown and described with respect to FIGS. 3A and 3B may be implemented on the computer system 600 of FIG. 6. The computer system 600 can be implemented using one or more processors 604, and one or more memory resources 606. In the context of FIGS. 3A and 3B, the secure start system 300, 340 can be implemented using one or more components of the computer system 600 shown in FIG. 6.

According to some examples, the computer system 600 may be implemented within an autonomous vehicle with software and hardware resources such as described with examples of FIGS. 1 through 3B. In an example shown, the computer system 600 can be distributed spatially into various regions of the autonomous vehicle, with various aspects integrated with other components of the autonomous vehicle itself. For example, the processors 604 and/or memory resources 606 can be provided in the trunk of the autonomous vehicle. The various processing resources 604 of the computer system 600 can also execute secure start instructions 612 using microprocessors or integrated circuits. In some examples, the secure start instructions 612 can be executed by the processing resources 604 or using field-programmable gate arrays (FPGAs).

In an example of FIG. 6, the computer system 600 can include a local communication interface 626 (or series of local links) to vehicle interfaces and other resources of the autonomous vehicle (e.g., the compute stack drives). In one implementation, the local communication interface 626 provides a data bus or other local links to electro-mechanical interfaces of the vehicle, such as wireless or wired links to the data processing system 210 (e.g., to initialize and decrypt the compute stack) and/or the AV control system 220 (e.g., once the compute stack is fully decrypted).

The memory resources 606 can include, for example, main memory, a read-only memory (ROM), storage device, and cache resources. The main memory of memory resources 606 can include random access memory (RAM) or other dynamic storage device, for storing information and instructions which are executable by the processors 604. The processors 604 can execute instructions for processing information stored with the main memory of the memory resources 606. The main memory 606 can also store temporary variables or other intermediate information which can be used during execution of instructions by one or more of the processors 604. The memory resources 606 can also include ROM or other static storage device for storing static information and instructions for one or more of the processors 604. The memory resources 606 can also include other forms of memory devices and components, such as a magnetic disk or optical disk, for purpose of storing information and instructions for use by one or more of the processors 604.

According to some examples, the memory 606 may store a plurality of software instructions including, for example, secure start instructions 612. The secure start instructions 612 may be executed by one or more of the processors 604 in order to implement functionality such as described with respect to the secure start system 235, 300, 340 of FIGS. 2, 3A, and 3B.

In certain examples, the computer system can also include a communications interface 650 to communicate with external resources (e.g., a backend system) over a network link 655. For example, in executing the secure start instructions 612, the processing resources 604 can retrieve, via the communication interface 650 over a secure communications session via the network link 655, a tunnel key 652 to establish a private communications session with backend data vault, and a set of decryption/verification keys 654 from the backend data vault via the private communications session. The processing resources 604 can utilize such decryption/verification keys 654 to initiate a verification and decryption process on the compute stack and enable full autonomous functionality for the AV.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A secure start system for an autonomous vehicle, the secure start system comprising:
 a compute stack comprising a plurality of encrypted drives that, when decrypted, enable one or more functions of the autonomous vehicle; and
 a communications router connected to the compute stack, the communications router comprising:
  an encrypted router drive; and
  an input interface to receive a boot-loader comprising a basic decryption key to (i) decrypt the encrypted router drive, and (ii) enable network communications with a backend system;
  wherein the secure start system (i) utilizes a tunnel key from the backend system to establish a private communications session with a backend data vault, and (ii) retrieves a set of decryption keys from the backend data vault, via the private communications session, to decrypt the plurality of encrypted drives.

2. The secure start system of claim 1, wherein the input interface comprises a universal serial bus (USB) interface, and wherein the boot-loader comprises a USB connected boot-up drive including the basic decryption key.

3. The secure start system of claim 1, wherein upon enabling network communications, the communications router transmits credentials from the boot-loader to the backend system, and wherein the communications router receives the tunnel key when the backend system authenticates the credentials.

4. The secure start system of claim 3, wherein the communications router transmits the credentials and receives the tunnel key using secure hypertext transfer protocol (HTTPS) communications with the backend system.

5. The secure start system of claim 1, wherein the tunnel key comprises an Internet Protocol Security (IPsec) tunnel key, and wherein the private communications session comprises an IPsec tunnel to the backend data vault to retrieve the set of decryption keys.

6. The secure start system of claim 1, wherein decryption of the plurality of encrypted drives using the set of decryption keys enables autonomous drive functions for the autonomous vehicle.

7. The secure start system of claim 1, wherein the compute stack comprises encrypted data logs to store session data corresponding to a drive session of the autonomous vehicle.

8. The secure start system of claim 7, wherein the data logs are accessible via insertion of a log reader into the input interface, and wherein the log reader includes a decryption key that decrypts the data logs to retrieve the session data.

9. An autonomous vehicle comprising:
a sensor system to dynamically generate sensor data indicating a situational environment of the autonomous vehicle;
acceleration, braking, and steering systems;
a compute stack comprising a plurality of encrypted drives that, when decrypted, (i) processes the sensor data to identify features when the autonomous vehicle operates in an autonomous drive mode, and (ii) utilizes the processed sensor data to operate the acceleration, braking, and steering systems in the autonomous drive mode; and
a secure start system connected to the compute stack, the secure start system comprising:
a communications router including an encrypted router drive; and
an input interface to receive a boot-loader comprising a basic decryption key to (i) decrypt the encrypted router drive, and (ii) enable network communications with a backend system;
wherein the secure start system (i) utilizes a tunnel key from the backend system to establish a private communications session with a backend data vault, and (ii) retrieves a set of decryption keys from the backend data vault, via the private communications session, to decrypt the plurality of encrypted drives.

10. The autonomous vehicle of claim 9, wherein the input interface comprises a universal serial bus (USB) interface, and wherein the boot-loader comprises a USB connected boot-up drive including the basic decryption key.

11. The autonomous vehicle of claim 9, wherein upon enabling network communications, the communications router transmits credentials from the boot-loader to the backend system, and wherein the communications router receives the tunnel key when the backend system authenticates the credentials.

12. The autonomous vehicle of claim 11, wherein the communications router transmits the credentials and receives the tunnel key using secure hypertext transfer protocol (HTTPS) communications with the backend system.

13. The autonomous vehicle of claim 9, wherein the tunnel key comprises an Internet Protocol Security (IPsec) tunnel key, and wherein the private communications session comprises an IPsec tunnel to the backend data vault to retrieve the set of decryption keys.

14. The autonomous vehicle of claim 9, wherein decryption of the plurality of encrypted drives using the set of decryption keys enables autonomous drive functions for the autonomous vehicle.

15. The autonomous vehicle of claim 9, wherein the compute stack comprises encrypted data logs to store session data corresponding to a drive session of the autonomous vehicle.

16. The autonomous vehicle of claim 15, wherein the data logs are accessible via insertion of a log reader into the input interface, and wherein the log reader includes a decryption key that decrypts the data logs to retrieve the session data.

17. A non-transitory computer-readable medium storing instructions that, when executed by one or more processors of a secure start system for an autonomous vehicle, cause the one or more processors to:
retrieve a basic decryption key from a boot-loader to (i) decrypt a router drive, and (ii) enable network communications with a backend system;
transmit credentials to the backend system;
when the credentials are authenticated, receive a tunnel key from the backend system;
utilize the tunnel key to establish a private communications session with a backend data vault; and
retrieve a set of decryption keys from the backend data vault, via the private communications session, to (i) decrypt a plurality of encrypted drives of the autonomous vehicle, and (ii) initiate an autonomous mode of the autonomous vehicle.

18. The non-transitory computer-readable medium of claim 17, wherein the executed instructions cause the one or more processors to transmit the credentials and receive the tunnel key using secure hypertext transfer protocol (HTTPS) communications with the backend system.

19. The non-transitory computer-readable medium of claim 17, wherein the tunnel key comprises an Internet Protocol Security (IPsec) tunnel key, and wherein the private communications session comprises an IPsec tunnel to the backend data vault to retrieve the set of decryption keys.

20. The non-transitory computer-readable medium of claim 17, wherein the executed instructions cause the one or more processors to retrieve the basic decryption key in response to the boot-loader being inserted into a universal serial bus (USB) interface of the router drive.

* * * * *